US007721966B2

(12) United States Patent  
Rudeen et al.

(10) Patent No.: US 7,721,966 B2  
(45) Date of Patent: May 25, 2010

(54) SYSTEM AND METHOD OF OPTICAL READING EMPLOYING VIRTUAL SCAN LINES

(75) Inventors: Robert W. Rudeen, Eugene, OR (US); Bryan L. Olmstead, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

(21) Appl. No.: 11/252,997

(22) Filed: Oct. 17, 2005

(65) Prior Publication Data

US 2006/0081712 A1    Apr. 20, 2006

Related U.S. Application Data

(60) Provisional application No. 60/620,053, filed on Oct. 18, 2004.

(51) Int. Cl.
```
G06K 9/24       (2006.01)
G06K 9/18       (2006.01)
G06K 9/32       (2006.01)
G06K 5/04       (2006.01)
G08C 21/00      (2006.01)
```
(52) U.S. Cl. .................... 235/462.21; 235/462.08; 235/462.07; 235/462.2

(58) Field of Classification Search ............ 235/462.25, 235/462.31, 462.2, 462.45, 462.21, 462.14, 235/462.39, 462.09, 462.1, 462.11, 462.01, 235/462.08, 454, 472.01, 472.02, 462.44

See application file for complete search history.

(56) References Cited

U.S. PATENT DOCUMENTS

| | | | |
|---|---|---|---|
| 5,146,463 A | 9/1992 | Rando | 372/24 |
| 5,155,343 A | 10/1992 | Chandler et al. | 235/462.09 |
| 5,272,322 A * | 12/1993 | Nishida et al. | 235/462.31 |
| 5,296,689 A | 3/1994 | Reddersen et al. | 235/467 |
| 5,365,597 A | 11/1994 | Holeva | 382/318 |
| 5,396,054 A | 3/1995 | Krichever et al. | 235/462 |
| 5,414,250 A | 5/1995 | Swartz et al. | 235/462 |
| 5,446,271 A | 8/1995 | Cherry et al. | 235/462 |

(Continued)

OTHER PUBLICATIONS

User's Guide for the ImageTeam™ OEM Engine, Hand Held Products, Inc. Rev.A (196 pages) including pp. 5-10 to 5-11 (bears copyright © 2002-2003; electronic date on file: Jul. 2003; publication date not known), available to inventor between Feb. 2004 and Jul. 2004.

*Primary Examiner*—Thien M. Le  
*Assistant Examiner*—Thien T Mai  
(74) *Attorney, Agent, or Firm*—Stoel Rives LLP

(57) ABSTRACT

Optical reading system and methods having multiple modes of operation, for example: omnidirectional and single-code picking; fixed and handheld reading; 1D and 2D code reading. In one configuration, an image-based system obtains input data via an area sensor (e.g., a 2D COD array) with only data corresponding to a pattern of virtual scan lines being stored and processed. A user may implement different operating modes such as a first mode reading codes in any location or orientation and a second mode reading only a code oriented along a particular virtual scan line or group thereof. Alternately, the data reader is operable to switch between handheld mode selecting a first pattern of virtual scan lines to process and/or decode and a fixed mode selecting a second pattern of virtual scan lines to process and/or decode. Virtual scan patterns in either mode can change from frame to frame.

34 Claims, 11 Drawing Sheets

U.S. PATENT DOCUMENTS

| | | | |
|---|---|---|---|
| 5,475,207 A | 12/1995 | Bobba et al. | 235/467 |
| 5,591,952 A * | 1/1997 | Krichever et al. | 235/462.11 |
| 5,635,699 A | 6/1997 | Cherry et al. | 235/462 |
| 5,756,981 A | 5/1998 | Roustaei et al. | 235/462.42 |
| 5,786,582 A | 7/1998 | Roustaei et al. | 235/462.07 |
| 5,814,803 A | 9/1998 | Olmstead | 235/462 |
| 6,060,722 A | 5/2000 | Havens et al. | 250/566 |
| 6,142,376 A | 11/2000 | Cherry et al. | 235/462.14 |
| 6,223,986 B1 | 5/2001 | Bobba et al. | 235/462.2 |
| 6,340,114 B1 * | 1/2002 | Correa et al. | 235/462.22 |
| 6,575,368 B1 * | 6/2003 | Tamburrini et al. | 235/462.25 |
| 6,637,658 B2 * | 10/2003 | Barber et al. | 235/462.45 |
| 6,991,169 B2 | 1/2006 | Bobba et al. | 235/462.39 |
| 2002/0084330 A1 * | 7/2002 | Chiu | 235/462.11 |
| 2003/0019934 A1 * | 1/2003 | Hunter et al. | 235/462.2 |
| 2003/0222147 A1 | 12/2003 | Havens et al. | 235/462.45 |
| 2004/0020990 A1 | 2/2004 | Havens et al. | 235/472.01 |
| 2005/0001035 A1 * | 1/2005 | Hawley et al. | 235/462.21 |
| 2005/0051627 A1 * | 3/2005 | Matushima et al. | 235/454 |
| 2005/0284942 A1 * | 12/2005 | Gurevich et al. | 235/462.21 |
| 2006/0043191 A1 * | 3/2006 | Patel et al. | 235/462.21 |

* cited by examiner

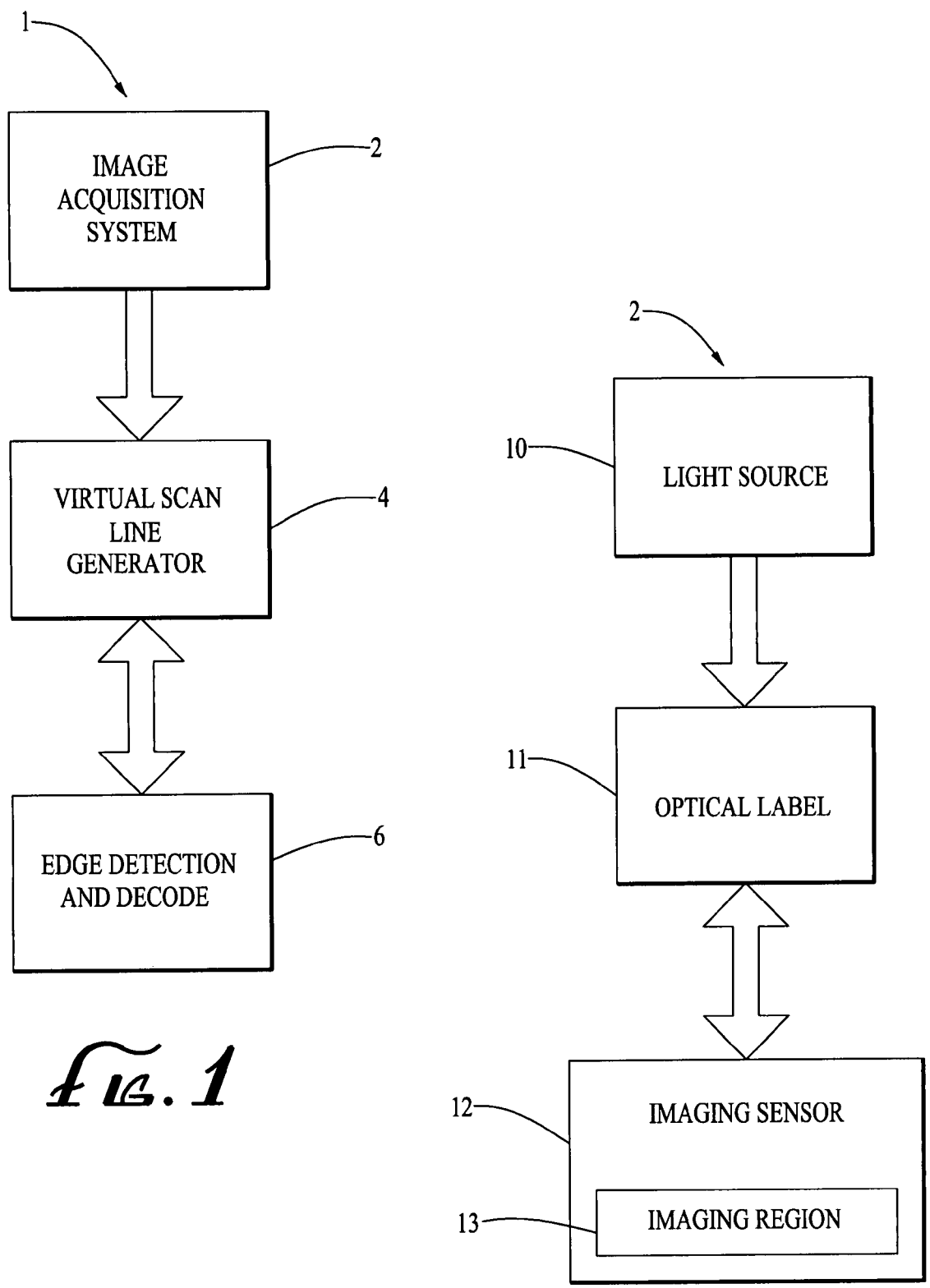

*fig.10a*  STARTING ORIENTATION
*fig.10b*  ROTATED 22 DEGREES
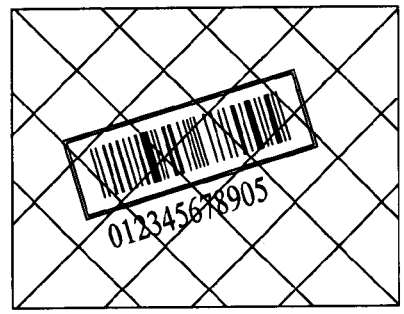
*fig.10c*  ROTATED 45 DEGREES
*fig.10d*  ROTATED 67 DEGREES

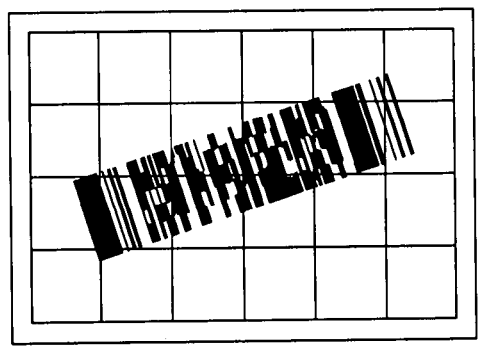
FIG. 11a    OMNI PATTERN
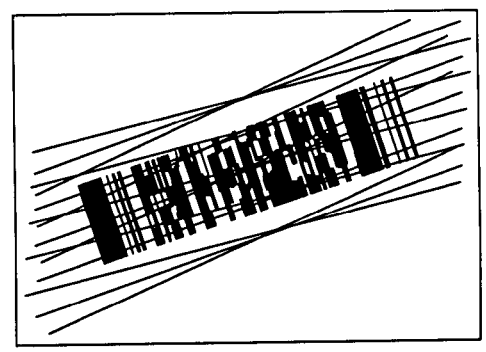
FIG. 11b    REDUCED SEARCH PATTERN
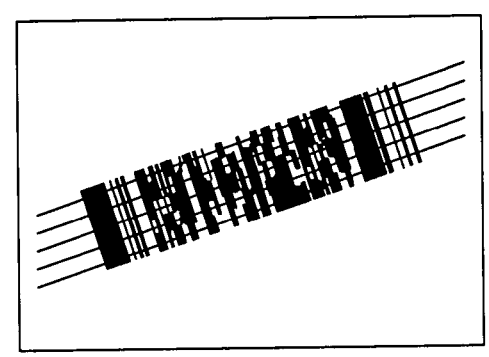
FIG. 11c    CORRECT DIRECTION AND POSITION

SYSTEM AND METHOD OF OPTICAL READING EMPLOYING VIRTUAL SCAN LINES

RELATED APPLICATION DATA

This application claims priority to provisional application Ser. No. 60/620,053 filed Oct. 18, 2004, hereby incorporated by reference.

BACKGROUND

The field of the present invention relates to data capture devices, such as scanners and other optical code and object reading devices. In certain embodiments, optical readers and methods of reading are described herein which employ virtual scan lines.

A barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding.

In one method of reading, referred to as a "scanning," an illumination beam is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in spot scanners is a typically a laser, but may comprise a coherent light source (such as a laser or laser diode) or non-coherent light source (such as light emitting diode). A laser illumination source may offer advantages of higher intensity illumination which may allow barcodes to be read over a larger range of distances from the barcode scanner (large depth of field) and under a wider range of background illumination conditions.

Another method of reading is referred to as the "imaging" method whereby light reflecting off a surface is detected by an array (commonly a charge-coupled device or CCD) of optical detectors. The scan surface is typically illuminated by some uniform light source, such as a light-emitting diode (LED). Alternately, the illumination may be provided by ambient light such as disclosed in U.S. Pat. No. 5,814,803 hereby incorporated by reference. In such an imaging technique, as with a scanning laser, an electrical signal is generated having an amplitude determined by the intensity of the collected light. In either the scanning laser or CCD technique, the amplitude of the electrical signal has one level for dark bars and a second level for light spaces. As the label is scanned, positive-going and negative-going transitions in the electrical signal occur, signifying transitions between bars and spaces. Techniques are known for detecting edges of bars and spaces by detecting the transitions of the electrical signal. Techniques are also known for determining the widths of bars and spaces based on the relative location of the detected edges and decoding the information represented by the bar code.

An imaging system may comprise a linear (one-dimensional) array or may comprise a two-dimensional array of CCD elements to obtain an entire image of the optical code at one time. However, the drawback of these two-dimensional devices is that large amounts of memory are needed to store the image to be processed, and large amounts of computation are needed to extract the edge location data from the stored image. Further, complicated algorithms are necessary to determine the orientation and characteristics of the bar code label. One method of overcoming certain of these drawbacks is described in U.S. Pat. No. 6,142,376, hereby incorporated by reference, which discloses a method for reading encoded symbols such as bar code labels by making efficient use of area scanned input. Input data is provided by an area sensor such as a two dimensional CCD array or a video tube, or a single line sensor (such as a single line CCD or a single line laser scanner) combined with either movement of the item or an additional transverse scanning mechanism providing the second axis of the raster scan. Not all of the scanning data, but only a select portion of the data corresponding to virtual scan lines is stored and processed. A pattern of virtual scan lines is defined based on the dimensions of bar code labels to be scanned, the size of the scanning area, and the characteristics of the scanning sensor and optics. The virtual scan lines are mapped onto the raster pattern, allowing the pixels of the raster which fall on the virtual scan lines to be identified. As the raster scan proceeds, information regarding the intensity of the detected light is stored only for the pixels comprising the virtual scan lines. The amount of data stored is a fraction of the total data in the raster. After the pixel values have been stored for a virtual scan line, the edges of the bars and spaces crossed by the line is determined by a suitable method such as analog or digital processing.

Generally, there are typically two types of scanners: handheld or fixed. In a fixed scanner, there are two modes of operation: "sweep" mode and "presentation" mode. In sweep mode, bar coded items are moved through a scan volume in front of the scanner, the scanner typically taking advantage of the movement of the item to enhance potential read coverage. In presentation mode, the item may be held by the operator in front of the scanner, the scanner preferably producing a sufficiently omnidirectional scan pattern to read the bar code in any orientation.

In a handheld scanner, an operator holds the scanner and manually aims a scan pattern at a bar code. Handheld single line scanners, whether imaging or flying spot laser, require that an operator aim and orient the scanner relative to the bar code so that the scan line is substantially perpendicular to the bar code edges. Such operation requires some care on the part of the operator and reduces productivity. Furthermore, these devices are sensitive to label defects, as detection of bar and space edges is typically done along a single narrow scan line. To maximize the productivity of the operator and minimize stresses due to repetitive motions of the operator's body, and to minimize sensitivity to label defects, it is generally desirable to read bar codes which may be at any orientation relative to the scanning device.

In the fixed mode of operation, a relatively wide angular field of view is required so that a barcode label can be read from the largest possible fraction of the surface of the barcoded object. Since objects are often passed through the scan volume in random orientations, a multi-dimensional pattern is necessary to efficiently read the barcode. In addition, a high scan rate is desirable to allow successful reading of barcodes which are quickly passed through the scan volume.

A simpler scan pattern or a single scan line is often sufficient for portable operation, since the relatively small portable barcode scanner can be rotated to orient the scan line correctly across the barcode. A relatively small angular field of view and a relatively longer depth of field are desirable in this mode of operation. The longer depth of field may also allow the operator to read the barcode from a greater (or closer) distance. The reduced angular field of view reduces the likelihood of inadvertent scanning of other barcode labels, but in turn leads to tighter aiming requirements. To facilitate proper orientation of the scan line relative to the barcode and aiming of the scanner, the scan line may be made sufficiently intense to be seen by the operator. Alternatively, a portable barcode scanner may be provided with pointer illuminators to facilitate aiming of the barcode scanner.

There are also hybrid scanners designed to operate both in fixed and handheld modes of operation. U.S. Pat. No. 6,575,368, hereby incorporated by reference, discloses a dual mode laser scanner that is switchable between a handheld mode generating a single scan line and a fixed mode generating a multiple scan line omnidirectional scan pattern. In one embodiment, the '368 patent discloses generating both sets of scan patterns, but only decoding the single scan line during handheld mode of operation.

The present inventor has recognized there is still a need for versatile and effective data readers of different configurations.

SUMMARY

The present invention is directed to optical reading systems. In a preferred embodiment, the system has multiple modes of operation, for example: (1) omnidirectional and single-code picking; (2) fixed and handheld reading; (3) 1D and 2D code reading. In a preferred configuration, the reading system is an image-based system wherein the input data may be provided by an area sensor such as a two dimensional CCD array, CMOS or a video tube, or other suitable mechanism. Preferably only a select portion of the data corresponding to virtual scan lines is stored and processed. The image is typically read out in a predefined pattern, such as a raster pattern, due to the limitations of the imaging device. A complete raster pattern from the top to the bottom of the image is termed a frame. As the raster scan proceeds, information regarding the intensity of the detected light is stored only for the pixels comprising the virtual scan lines. The amount of data stored is a fraction of the total data in the raster.

In certain embodiments the system may permit complex patterns of scan lines to be read and processed by a simple, compact sensing device. The system may permit the user to implement different operating modes such as a first mode of reading optical codes in any location or orientation and a second mode of reading only an optical code oriented along a particular virtual scan line or group of lines, for example lines intersecting an aiming pattern or a band of parallel virtual scan lines.

In another embodiment, the virtual scan pattern changes from frame to frame. The pattern may begin with an omnidirectional pattern and then change to a different omnidirectional pattern to provide more dense coverage. Such dense coverage may be useful, for example, to read highly truncated labels.

In another embodiment, the virtual scan pattern changes from frame to frame. The pattern may begin with an omnidirectional pattern and then change to a directional pattern, such as a set of parallel lines, as the system recognizes portions of a barcode to be read. This enables higher performance with a lower processing burden, as more of the virtual scan lines become oriented in the direction of the barcode.

In another embodiment, the data reader comprises a portable unit enabled to be operated in a handheld mode. Preferably, the portable unit has multiple operating modes. For example, the data reader may be operable to switch between operating in a handheld mode selecting a first pattern of virtual scan lines to process and/or decode and a fixed mode selecting a second pattern of virtual scan lines to process and/or decode.

The foregoing and other objects, features, and advantages will become apparent from the following more detailed description set forth in conjunction with the accompanying drawings. It is intended that each of these disclosed embodiments may be implemented individually or in combination with other of the embodiments.

BRIEF DESCRIPTION OF THE DRAWINGS

FIG. 1 is a block diagram showing an optical code scanning system employing virtual scan line methodology.

FIG. 2 is a more detailed block diagram of an image acquisition system block as depicted in FIG. 1.

FIGS. 10a-d are diagrams showing a progression of virtual scan patterns according to another embodiment.

FIGS. 11a-c are diagrams showing a progression of virtual scan patterns according to another embodiment.

DETAILED DESCRIPTION OF THE PREFERRED EMBODIMENTS

Figure 3:
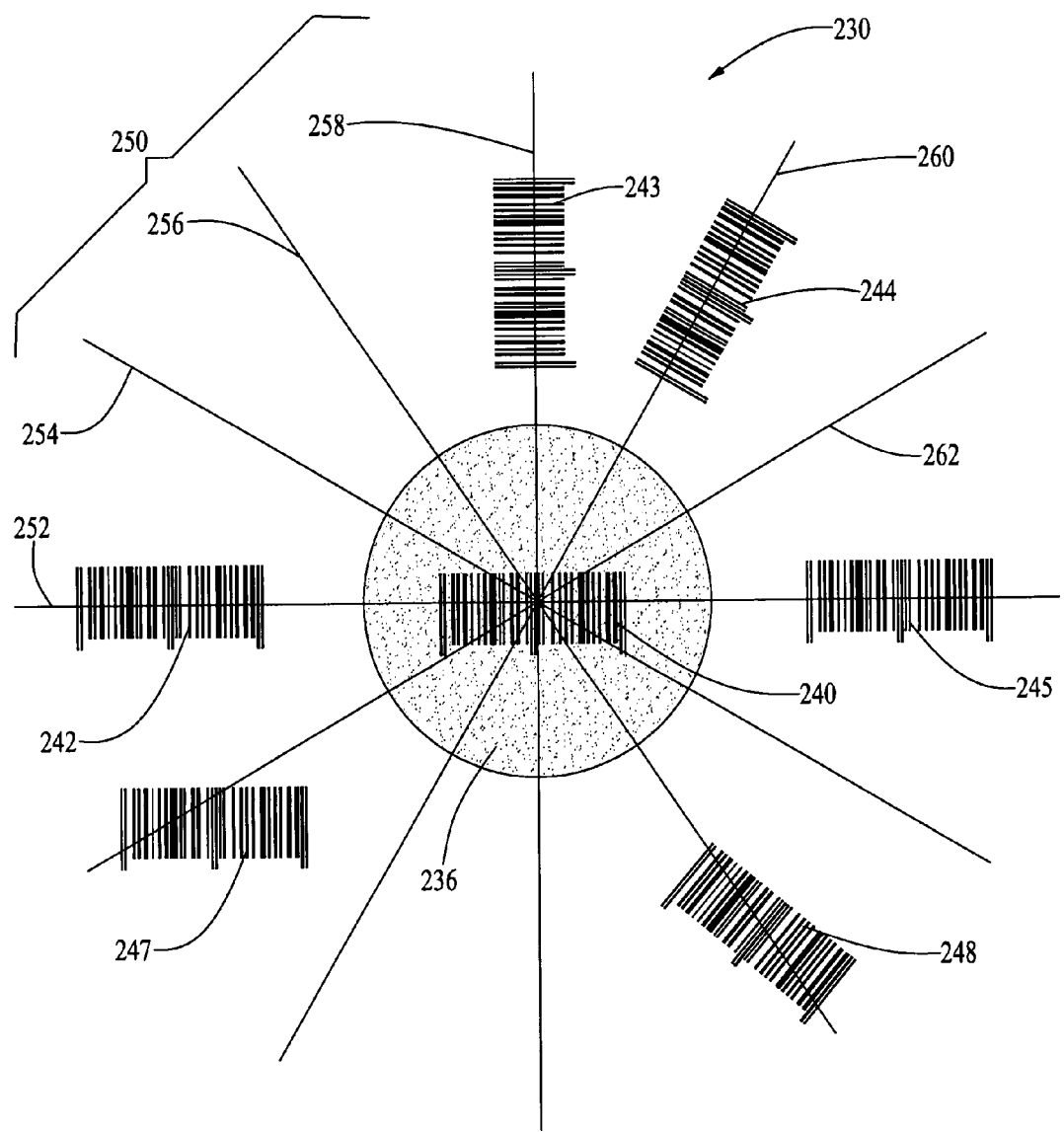
FIG. 3 is a diagram showing projection of an optical code or minimum decodable piece onto a raster scanning surface according to a first embodiment.

The preferred embodiments will now be described with reference to the drawings. Certain preferred embodiments may be described with respect to barcodes (1D and 2D codes), but the disclosure should be understood as applicable to various types of optical codes (e.g. MaxiCode and PDF417) as well as other recognition elements such as fingerprints.

FIG. 1 is a block diagram of a scanning system 1 according to a preferred embodiment, wherein the system 1 may be divided at an abstract level into an image acquisition block 2, a virtual scan line generator block 4, and an edge detection and decode block 6. Referring to FIG. 2, the image acquisition block 2 comprises a light source 10 illuminating a optical label 11 and an imaging sensor 12 comprised of optics (not shown) detecting the reflected and/or refracted light from the optical label 11. The imaging sensor 12 has a planar imaging region 13 and may be, for example, a two-dimensional CCD array. Alternatively, the planar imaging region 13 of the optical sensor 12 may be a linear CCD array that obtains a second dimension of raster input by relative motion of the optical sensor 12 to the optical label 11. The relative motion may be created by sweeping the optical sensor 12 across an optical label 11, or by sweeping the optical label 11 manually or automatically (e.g., by conveyor) across the optical sensor 12. In the case of a linear CCD array, one dimension of the imaging region 13 is defined by the relative motion of the optical sensor 12 to the optical label 11 over some period of time. Although the imaging region 13 may be various shapes, a planar imaging surface is preferred. In contrast to a conventional multi-line laser scanner having a laser and mirrors, the optical sensing portion of an area scanning system may be quite small because of the relatively small size of the CCD array.

Any suitable imaging mechanism may be employed, preferably one capable of detecting a 2-D image, including CCD or CMOS. Preferably, the sensing mechanism is an image-based solid state device comprising either a single detector or an array of detectors.

In another system where a moving spot laser is scanned in a sufficiently dense pattern so as to create/approximate a 2-D sensor array output, typically a single detector may be employed. The data may be processed in several fashions. In one processing system, the data is dropped in serial fashion into a buffer array, the array is then processed by selecting the data points corresponding to the virtual scan line pattern. Alternately, as the signal is detected, the data points corresponding to the virtual scan lines may picked off as they arrive and sent directly to the processor (for decoding), thus not requiring a buffer at all. In another preferred method, the data points corresponding to the virtual scan lines are picked off as they arrive and placed into smaller virtual scan line buffers, one virtual scan line buffer corresponding to each virtual scan line. As each virtual scan line buffer is completed, that virtual scan line buffer data is sent to the processor for decoding. Since horizontal virtual scan lines are complete within a single row of the 2D array, then such a horizontal virtual scan line may be sent directly to the processor without buffering. The Bresenham line drawing algorithm is an efficient software algorithm to implement the choosing of virtual scan line pixels.

In a 2D imaging array, the image is acquired onto the sensor array, and then the pixel information from the array is stored in memory (e.g. a memory buffer) corresponding to the sensor array. FIG. 3 illustrates a preferred system in which a pattern 250 of virtual scan lines 252, 254, 256, 258, 260, 262 is generated within the imaging region to capture the barcode with a minimum amount of memory storage. Preferably, the pixel data from the imaging array is read out serially, and the data points corresponding to the virtual scan lines are picked off as they arrive and placed into smaller virtual scan line buffers, one virtual scan line buffer corresponding to each virtual scan line. As each virtual scan line buffer is completed, that virtual scan line buffer data is sent to the processor for decoding. Since horizontal virtual scan lines are complete within a single row of the 2D array, then such a horizontal virtual scan line (e.g., line 252 in FIG. 3) may be sent directly to the processor without buffering. The Bresenham line drawing algorithm is an efficient software algorithm to implement the choosing of virtual scan line pixels. Though only six virtual scan lines 252-262 are shown, other number of virtual scan lines or patterns may be employed. The asterisk pattern 250 of virtual scan lines provides a reasonable likelihood of capturing a barcode label (e.g. label 240) disposed at various orientation within the imaging region 230. It is noted that the configuration of the particular virtual scan line pattern depends upon the dimensions and type of the optical code to be scanned, the size of the scanning area, and the characteristics of the scanning sensor and optics.

In the system of FIG. 3, a targeting or aiming pattern 236 is generated and disposed at the center of the imaging region 230 to assist the user in locating the barcode on the item at an optimum position relative to the scanner. In this example, the aiming pattern 236 is illustrated as a large circular spot at the center of the scan pattern 250. Alternately, the aiming pattern may comprise any suitable shape, such as an aiming spot, a geometric shape, a two-dimensional image, an aiming line segment, a geometric pattern, a logo image, or a recognizable pattern such as an image of a barcode or a shipping label. Other shapes or images of aiming pattern are described in U.S. Pat. No. 6,223,986 hereby incorporated by reference. Preferably the aiming pattern is generated by a separate light source than the system's illumination source, but it may be generated by the same source via a suitable method such as methods disclosed in U.S. Pat. No. 6,575,368, 5,296,689, or 5,146,463 each hereby incorporated by reference. The aiming pattern may be employed in any one or more of the various modes of operation. The aiming pattern may be generated by any suitable mechanism such as LED, laser diode, halogen, broad band or white light source, or any suitable visible light.

In FIG. 3, barcodes 240, 242, 243, 244, 245, and 248 can be decoded by one of the virtual scan lines 252, 256, 258, and 260. It is often desirable that only the barcode that intersects the aiming pattern 236 be acknowledged and transmitted to the host terminal. In this case, the location along the virtual scan lines of each barcode that can be identified is determined and compared with the location of the aiming pattern on the corresponding virtual scan line. If at least a portion of the barcode is determined to be close to or intersecting the aiming pattern 236, the data is then acknowledged and transmitted to the host terminal.

In FIG. 3, only barcode 240 meets this positional condition. Although barcodes 243, 244, 245, 248, and 252 are capable of being read, once enough information is gathered to determine that they are not within a predetermined range of the center of the aiming pattern, they are ignored. In some cases, all of the barcodes may be read by the scanner in order to verify their locations along the virtual scan lines but only barcode 240 will be acknowledged and transmitted to the host terminal.

Various activation schemes for the aiming pattern may be employed. For example, the aiming pattern may be on continuously and even used as non-ambient lighting for the image reading. The aiming pattern may be used in a wake-up feature. In another configuration, since the aiming pattern may interfere with reading, the aiming pattern may be cycled on and off intermittently with reading process such as:

turning aiming pattern on;
    turning aiming pattern off;
    acquiring an image;
    turning aiming pattern on;
    turning aiming pattern off;
    acquiring an image; etc.

Instead of alternating, the system may use a filter or dichroic mirror to allow simultaneous aiming pattern projection and image reading. The aiming pattern may alternately be generated from a specific color of light that does not interfere with the imaging process or may be readily filtered.

Preferably the aiming pattern is coincident (or alternately parallel or coaxial) with the field of view of the reader so that the axis of the light that generates the aiming pattern is coincident or parallel with the axis of the imaging system. The larger, more diffuse the aiming pattern/spot the less parallel/coincident the aiming pattern need be.

It is noted that the likelihood of a bar code being successfully read by this pattern 250 depends upon both the orientation and location of the bar code within the scan region 230. In this pattern, a bar code 240 located near the center within the aiming spot 236 has the highest likelihood of being successfully read. Further out from the center, bar codes oriented such as labels 242, 243, 244, 245 aligned with a respective virtual scan line are successfully read. A bar code such as label 248 located in an outer portion of the scan region 230 and obliquely intersecting virtual scan line 248 may also be successfully read by a single virtual scan line.

When operated as a sweep scanner, the item being scanned is moved into and through the scan volume 230. This movement gives the scan lines the opportunity for a complete scan (or partial scan which may be stitched with other code segments) of a bar code as it is passed across a scan line.

When operated in a presentation mode or a handheld mode, the bar code label remains generally stationary relative to the pattern so if the code does not fall on a virtual scan line, the code may not be successfully read. Since the scan lines of the virtual pattern are arbitrary and controlled via software, the pattern may be changed to enhance the probability of a successful scan. For example, the asterisk pattern 250 may be rotated 2° for each consecutive scan thereby enhancing the probability of scanning all the segments of code anywhere in the scan volume 230. Other schemes for modifying of the virtual scan patterns may be employed.

Figure 4:
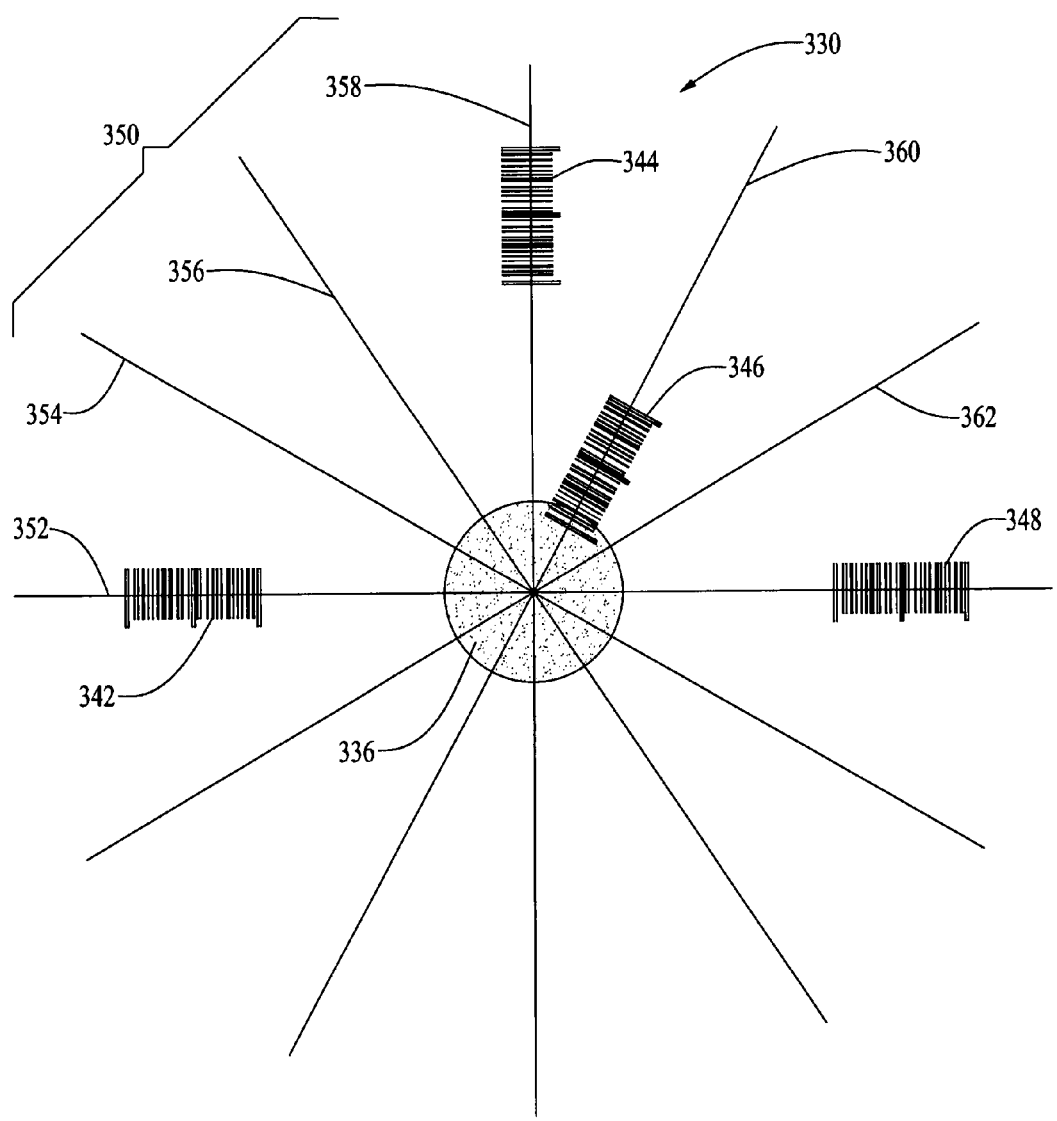
FIG. 4 is a diagram showing projection of an optical code or minimum decodable piece onto a raster scanning surface according to a second embodiment.

FIG. 4 illustrates another system in which a pattern 350 of virtual scan lines 352, 354, 356, 358, 360, 362 is generated within the imaging region 330 to capture a barcode. Only six virtual scan lines 352-362 are shown. The asterisk pattern 350 of virtual scan lines provides a reasonable likelihood of capturing a barcode label (e.g. label 346) disposed at various orientations within the imaging region 330. It is noted that the configuration of the particular pattern depends upon the dimensions of the bar code labels to be scanned, the size of the scanning area, and the characteristics of the scanning sensor and optics.

In the system of FIG. 4, a targeting or aiming pattern 336 is generated and disposed at the center of the imaging region 330 to assist the user in locating the barcode on the item at an optimum position relative to the scanner. In this example, the aiming pattern 336 is illustrated as a small circular spot at the center of the scan pattern 350. Alternately, the aiming pattern may comprise any suitable shape such as described previously.

In the system of FIG. 4, the aiming pattern 336 is smaller than aiming pattern 236 of FIG. 3. In this case, the scanner may be configured to acknowledge and send barcode 346 to the host even though it is not completely enclosed by aiming pattern 336. In the extreme case where the radius of aiming pattern 336 becomes very small, the scanner can be configured to acknowledge and transmit barcodes that intersect a certain region around the aiming pattern. This region can be configured to be different sizes and shapes, depending on the application.

It is noted that the likelihood of a bar code being successfully read by this pattern 350 depends upon both the orientation and location of the bar code within the scan region 330. In this pattern, a bar code 346 located near the center within the aiming pattern/spot 336 has the highest likelihood of being successfully read and since it intersects the aiming/spot 336 it may be selectively read by the system. Further out from the center, bar codes oriented such as labels 342, 344, 348 aligned with a respective virtual scan line may be successfully read, but may be selectively excluded as not intersecting the aiming pattern 336.

Figure 5:
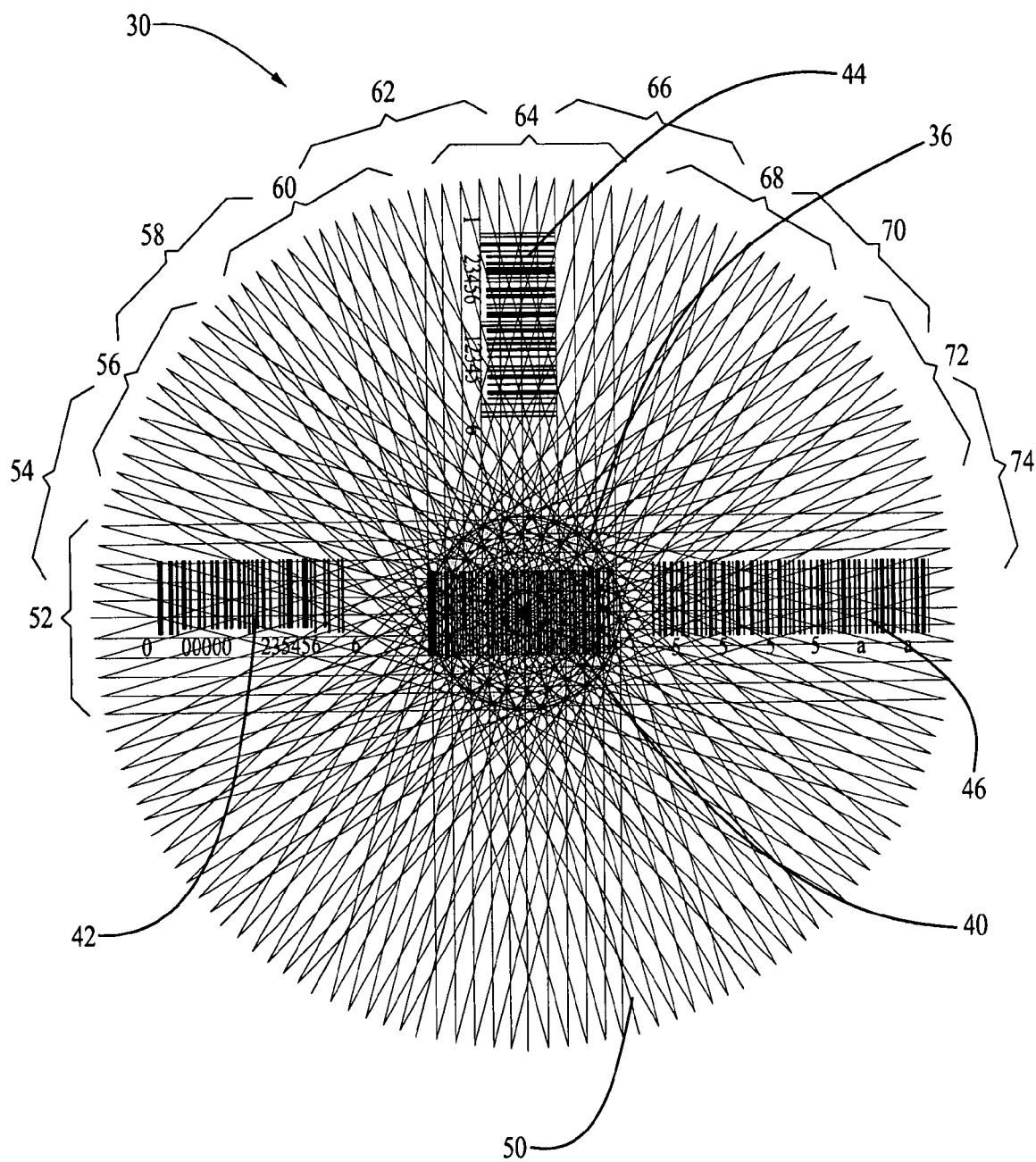
FIG. 5 is a diagram showing projection of an optical code label or minimum decodable piece onto a raster scanning surface according to a third embodiment.

FIG. 5 illustrates a preferred system in which a pattern of virtual scan lines 50 is generated within the imaging region to provide a high likelihood of capture of the barcode with a minimum amount of memory storage. The asterisk pattern of virtual scan lines 50 provides a high likelihood of capturing any of the barcode label 40, 42, 44, 46 disposed at any orientation within the imaging region 30. The particular pattern depends upon the dimensions of the bar code labels to be scanned, the size of the scanning area, and the characteristics of the scanning sensor and optics. The pattern is designed so a minimum decodable piece of a barcode label 40 which is positioned anywhere in the imaging region 30 and at any orientation, will be readable by at least one virtual scan line.

In the system of FIG. 5, a targeting or aiming pattern 36 is generated and disposed at the center of the imaging region 30. In this example, the aiming pattern 36 is illustrated as a large circular spot at the center of the scan pattern 50. Alternately, the aiming pattern may comprise any suitable shape, such as an aiming spot, a geometric shape, a two-dimensional image, an aiming line segment, a geometric pattern, a logo image, or a recognizable pattern such as an image of a barcode, a shipping label. Other shapes or images of aiming pattern are described in U.S. Pat. No. 6,223,986 hereby incorporated by reference. Preferably the aiming pattern is generated by a separate light source than the system's illumination source, but it may be generated by the same source via a suitable method such as methods disclosed in U.S. Pat. No. 6,575,368, 5,296,689, or 5,146,463 each hereby incorporated by reference. The aiming pattern may be employed in any one or more of the various modes of operation.

In one embodiment, the scan pattern 50 is comprised of a plurality of bands 52, 54, 56, 58, 62, 64, 66, 68, 70, 72, 74 each of a plurality of generally parallel virtual scan lines. In the embodiment of FIG. 5, there are eleven generally parallel virtual scan lines in each band 52, 54 etc., with each band being rotationally offset by about 15° to the band adjacent thereto. Other suitable virtual scan line patterns may be employed such as a raster pattern, an asterisk pattern, a multiple raster with lines at varying angles, or an omnidirectional pattern such as emulating scan patterns generated by laser scanners such as the PSC Inc. Magellan® scanner described in U.S. Pat. No. 5,475,207 or the PSC Inc. Duet® scanner described in U.S. Pat. No. 6,575,368, each of these hereby incorporated by reference. Though a band of parallel lines provides certain advantages when picking out a single barcode, a single line pattern may be preferred in certain applications.

Figure 6:
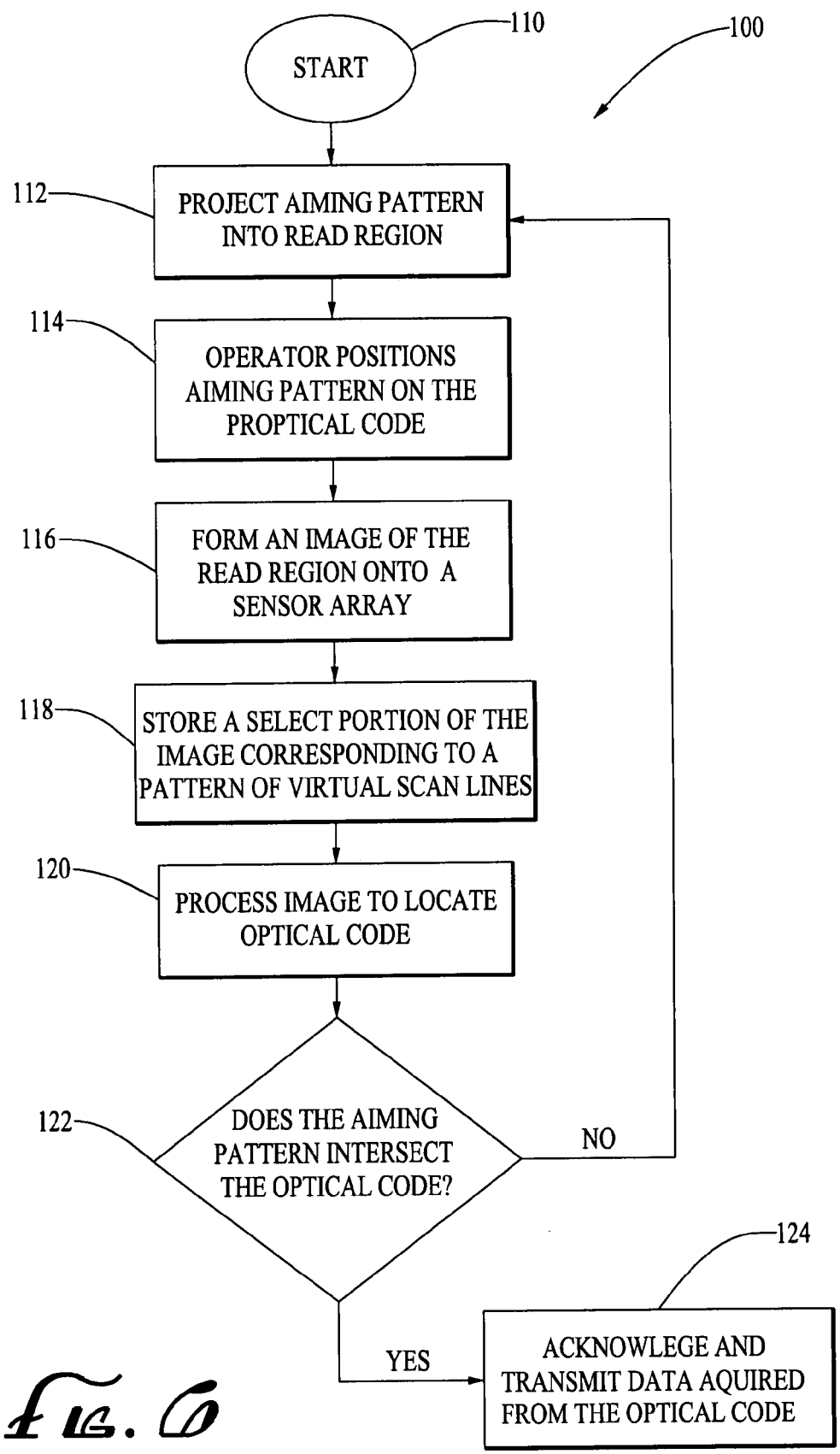
FIG. 6 is a flow chart for a method of data acquisition according to a first embodiment.

A first embodiment comprises a reading system and method whereby a single barcode 40 out of a plurality of barcodes 40, 42, 44, 46 within the scan region 30 is reported and/or decoded. FIG. 6 illustrates a first preferred method 100 that may comprise the following steps:

Step 110: Start.

Step 112: Projecting an aiming pattern 36 into the scan region 30 by, for example, one of the suitable methods described above.

Step 114: The operator (not shown) positioning the aiming pattern 36 onto the optical code 40 which is desired to read out of the plurality of optical codes 40, 42, 44, 46 in the scan region 30. There are multiple ways of positioning the scan pattern. If the data reader is handheld, the operator manipulates the reader so as to aim/move the aiming pattern onto the barcode. If the data reader is a fixed unit, the operator moves the item bearing the barcode into the scan region, positioning the item such that the barcode is positioned within or intersecting the spot.

Step 116: Forming an image of the scan region 30 onto a sensor array or imaging sensor 12 and detecting the image.

Step 118: Storing only a selected portion of data comprised of selected points of the image corresponding to a pattern of virtual scan lines 50. In the illustrated pattern 50 of FIG. 5, there are 264 virtual scan lines, eleven scan lines in each of the 24 bands 52 to 98 of virtual scan lines.

Step 120: Processing the stored data to locate an optical code.

Step 122: Determining if the aiming pattern intersects the optical code found in Step 120. If the aiming pattern is determined to intersect the optical code, proceeding to Step 124.

Step 124: Acknowledging and transmitting data acquired from the optical code.

In Steps 122 and the previous Step 120, the system reads the optical code that is intersected by the aiming pattern 36. For example, in FIG. 3, only optical code 40 is intersected by the aiming pattern 36. Thus only optical 40 is read, the system acknowledging with the customary successful read "beep" for example, and the data from that code is then transmitted to the host or POS.

If it is determined in Step 122 that the optical code found does not intersect the aiming pattern, that optical code is ignored.

The process is repeated from step 112 as the operator moves the aiming pattern onto the desired optical code.

The selected portion of data may be decoded at any suitable stage, including (1) prior to determining if the aiming pattern intersects the optical code, (2) after determining if the aiming pattern intersects the optical code and prior to transmitting, or (3) after transmitting.

Alternately, the system may selectively switch between (a) a first mode of operation wherein an optical code is acknowledged and transmitted only if the aiming pattern is determined to intersect the optical code and (b) a second mode of operation wherein an optical code is acknowledged and transmitted regardless of whether the aiming pattern is determined to intersect the optical code.

The system may be provided with a switch whereupon the system switches modes upon actuation of the switch by the operator. For example, an external switch or button may be provided on the reader housing. Upon actuation of the switch by the operator, the reader may switch into the code picking mode whereby the reader activates the aiming pattern and only reads the barcode intersecting the aiming pattern.

In another embodiment, a first switch activation may be used to initiate the aiming pattern and a second activation of the same switch or another switch may be used to read the optical code intersecting the aiming pattern.

In another embodiment, the reader may comprises a portable unit operable in a fixed mode and a handheld mode. The switch may comprise either a manually actuated switch on the housing or alternately a sensor which senses when the reader is moved (using a motion sensor or accelerometer) or is grasped by the operator (such as a contact sensor). Upon sensing that the reader has been moved or grasped, the reader activates the aiming pattern and only reads the barcode intersected by the aiming pattern.

In another preferred method, a single optical code out of a plurality of optical codes present in the scan region is acknowledged and transmitted by the steps of Acquiring an image of a scan region 30 into a sensor array 12.

Reading only a selected optical code 40 out of a plurality of optical codes 40, 42, 44, 46 present within the scan region 30, by the steps of projecting an aiming pattern 36 into the scan region 30;
positioning (preferably by action of an operator) the aiming pattern 36 onto the selected optical code 40;
processing a selected portion of data at only selected points along a pattern of virtual scan lines 50 in the scan region 30 and thereby locating an optical code;
determining if the aiming pattern 36 intersects the optical code that has been located;
if the aiming pattern 36 is determined to intersect the optical code that has been located, acknowledging and transmitting the optical code.

While operating in the handheld mode, switching between operating in the first mode and operating in the second mode.

The selected portion of data may be decoded at any suitable stage, including (1) prior to determining if the aiming pattern intersects the optical code, (2) after determining if the aiming pattern intersects the optical code and prior to transmitting, or (3) after transmitting. Alternately, the system may selectively switch between (a) a first mode of operation wherein an optical code is acknowledged and transmitted only if the aiming pattern is determined to intersect the optical code and (b) a second mode of operation wherein an optical code is acknowledged and transmitted regardless of whether the aiming pattern is determined to intersect the optical code. The method may comprise reading optical codes with a portable data reader operable in a fixed mode and a handheld mode.

Another preferred method for reading optical symbols with a data reader, may comprise the following steps:

Acquiring an image of a two-dimensional imaging region into a sensor array.

Operating in a first mode by processing a selected portion of data at only selected points along a pattern of virtual scan lines arranged in multiple directions about the two-dimensional imaging region.

Operating in a second mode by processing a selected portion of data at only selected points along a pattern of virtual scan lines consisting of a band of a plurality of generally parallel virtual scan lines. FIG. 5 illustrates a specific band 52 of eleven generally parallel virtual scan lines. The band of lines provides for added density along a scan direction for reading optical codes such as barcodes and PDF-417 codes.

Decoding the selected portion of data according to the pattern of virtual scan lines.

As with previous embodiments, the reader may comprise a housing suitable for portable operation. A switch provided on the reader housing permits the operator to switch between the first mode and the second mode via actuation of the switch. Alternately a portable unit may include a sensor for sensing either motion of the unit or grasping by the operator and switching from the first mode to the second mode upon sensing that the data reader has been grasped by the user.

In another embodiment, optical codes are read by the steps of:

Acquiring an image of a two-dimensional imaging region 30 into a sensor array 12.

Operating in a handheld mode by processing a only selected portion of data at selected points along a pattern of virtual scan lines consisting of (a) a single virtual scan line or (b) a band of a plurality of generally parallel virtual scan lines;

Operating in a fixed mode by processing only a selected portion of data at only selected points along a pattern of virtual scan lines arranged in multiple directions about the two-dimensional imaging region;

Decoding the selected portion of data according to the pattern of virtual scan lines.

In a method according to another embodiment, optical codes are read with a data reader by the steps of Acquiring an image of a two-dimensional imaging region into a sensor array.

Operating in a handheld mode by (1) generating an aiming pattern whereby a user positions the aiming pattern onto an optical code within the imaging region, and (2) storing data at only selected points along a pattern of virtual scan lines intersecting the aiming pattern.

Decoding data that has been stored.

This method may be operable for switching as between the fixed mode of operation and the handheld mode of operation. In one embodiment, when operating in the fixed mode, the reader stores only a selected portion of data at selected points along a pattern of a plurality of virtual scan lines spanning the two-dimensional imaging region in multiple directions. That selected portion is a subset of the entirety of virtual scan lines such as (1) a single scan line, (2) a band of a plurality of parallel scan lines, (3) a specialized pattern for example designed for efficient reading of particular label such as PDF-417 symbology.

In yet another embodiment, a data reader may read optical symbols by the steps of:

Acquiring an image of a two-dimensional imaging region into a sensor array.

Projecting an aiming pattern into the two-dimensional imaging region.

Operating in a first mode by processing only a selected portion of data at only selected points along a pattern of virtual scan lines arranged in multiple directions about the two-dimensional imaging region.

Operating in a second mode by processing only a selected portion of data at only selected points along a pattern of virtual scan lines intersecting the aiming pattern.

Decoding the selected portion of data according to the pattern of virtual scan lines.

The scan region is preferably imaged by a sensor array such as a CCD CMOS with a pattern of virtual scan lines defining a selected portion of the image data to be stored and processed. The above methods may be implemented in a system with the scan data generated by a laser beam. In such a system, the laser beam is scanned by rotating or oscillating mirror(s), or other suitable method, to produce a desired two-dimensional scan pattern such as an asterisk pattern. Return signal is collected onto a detector. Applied to one of the above-described methods, knowing the identity/location or each scan line, only the bar code intersecting the aiming pattern is acknowledged.

The size and shape of the aiming pattern may be optimized to obtain desired functionality. For example, the aiming spot 236 of FIG. 3 is relatively large, that is significantly larger than a typical UPC/EAN barcode. Of course the size of the spot 236 will likely depend in part upon the distance of the barcode from the scanner. The relative spot size is considered at a typical reading distance. In one methodology, the system may select to decode or read only barcodes that fall completely within the aiming spot 236 such as barcode 240. Alternately, the system may decode or read only barcodes that intersect the spot 236.

In another example, the aiming spot 336 of FIG. 4 is relatively small and the system may selectively decode, read or report only barcodes such as barcode 346 that intersect the spot.

Figure 7:
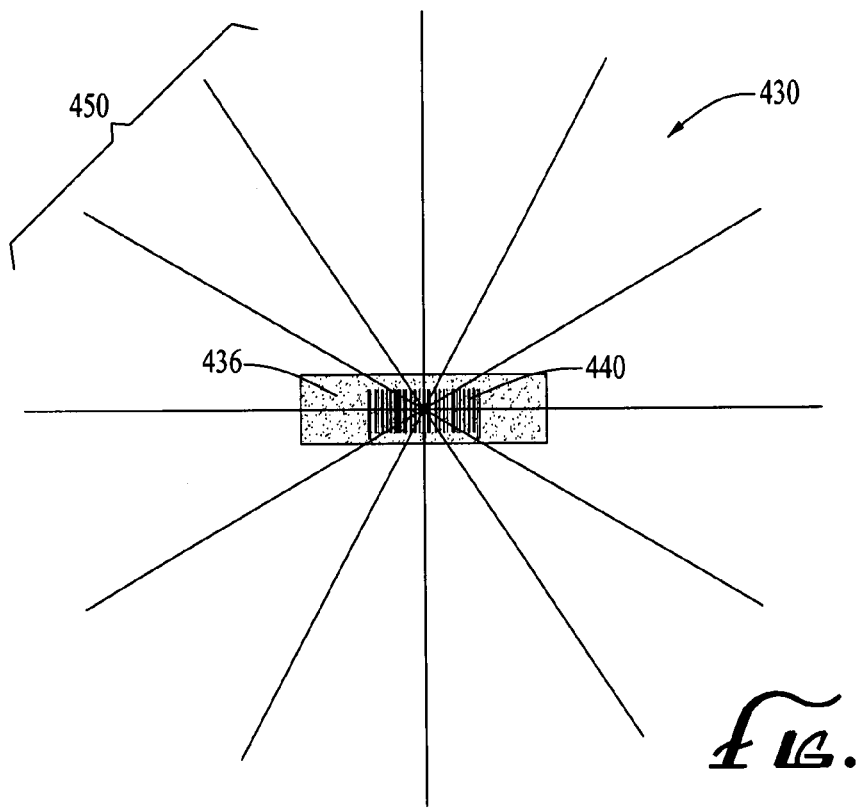
FIG. 7 is a diagram showing projection of an optical code onto a raster scanning surface according to a fourth embodiment.

Another system 430 is shown in FIG. 7 wherein the virtual scan pattern 450 may be any suitable configuration, here again shown as an asterisk pattern. In this system, the aiming pattern 436 is rectangular with its long axis oriented horizontally. Such a shaped pattern may urge the user to orient the barcode 440 in a similar orientation as shown in the figure.

Figure 8:
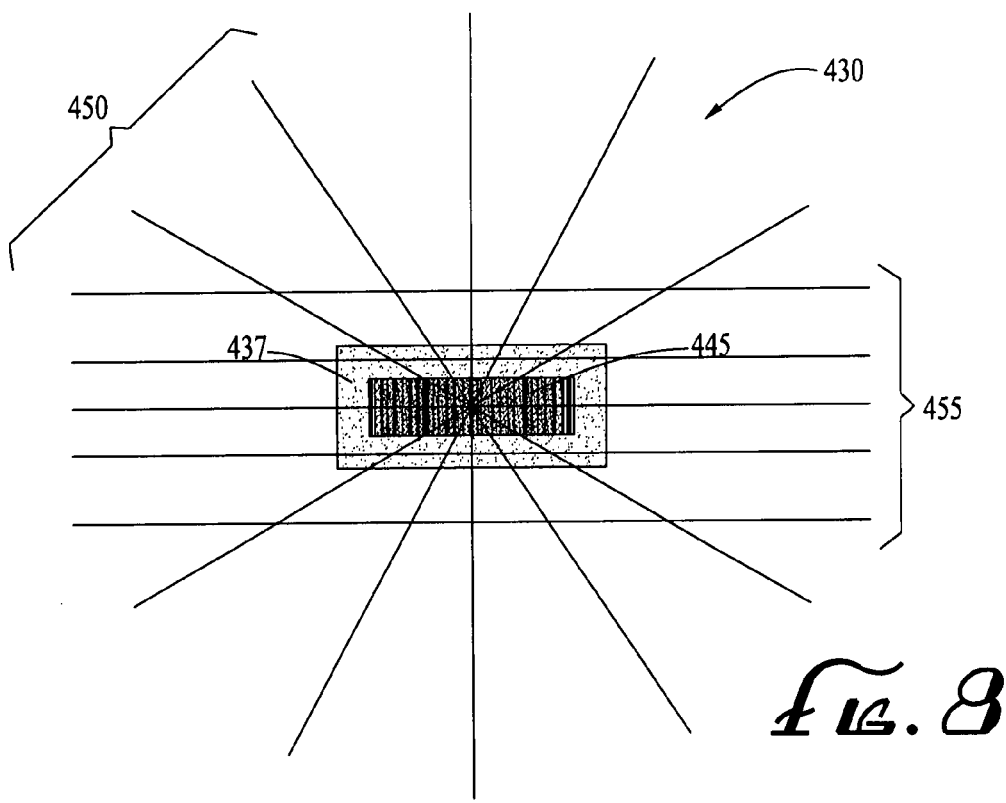
FIG. 8 is a diagram showing projection of an optical code onto a raster scanning surface according to a fifth embodiment.

The virtual scan line system may also be adaptive, changing the scan pattern based upon reading. As shown in FIG. 8, if while scanning a PDF417 barcode 445 and the system detects this particular type of barcode, the system may adapt, changing the aiming spot from the smaller rectangle 436 of FIG. 7 to another configuration such as to larger rectangle 437, and also changing the scan pattern 450 for example by adding some additional scan lines 455 (the figure shows only four additional horizontal virtual scan lines, but a larger number of such lines would be preferred) for optimizing reading of this type of optical code.

FIGS. 10a-d are diagrams showing a progression of virtual scan patterns according to another embodiment. In this embodiment, a denser scan pattern is created by rotating a sparser pattern from frame to frame. FIG. 10a shows a captured frame that is processed with six vertical scan lines and five horizontal scan lines. FIG. 10b shows the subsequent frame with the virtual scan pattern rotated 22 degrees. FIG. 10c shows a subsequent frame with another 23 degree rotation for a total of 45 degrees. FIG. 10d shows a subsequent frame with a total of 67 degree rotation from FIG. 10a. The next frame would continue with the scan pattern of FIG. 10a. In this manner, the combined scan pattern of four frames has 44 scan lines in 8 different orientations, while being implemented with a scan pattern that has only 11 scan lines per frame in two orientations. This method allows for improved reading of truncated barcodes without additional processing of scan lines per frame. In addition to rotation, the virtual scan lines may be offset from each other on subsequent frames to create a more dense pattern when averaged over more than one frame.

FIGS. 11a-c further illustrates the adaptive scan line concept. In FIG. 11a the scan pattern is designed for omnidirectional reading. If one of the scan lines in FIG. 11a has a decodable portion of a barcode, the scan pattern is modified to include scan lines of similar orientation. A set of parallel lines of similar orientation and nearby orientation are generated to more accurately line up with the barcode, as shown in FIG. 11b, the so-called "reduced search pattern". Subsequent frames could use virtual scan lines that use more parallel lines with fewer orientations, as the orientation of the barcode is discovered by which virtual scan lines have the most decodable information contained within them, as shown in FIG. 11c. While this scheme is particularly effective with stacked codes like PDF417, it also improves the read rate of linear codes like UPC. The virtual scan line pattern may adapt, changing the virtual pattern even as frequently as between frames. Alternately, a different scan pattern may be applied to the same frame if the frame data is stored in memory.

For example, a preferred method of adapting as between frames may comprise the following steps:

acquiring data from a two-dimensional scan region;

in a first frame, storing portions of the two-dimensional scan region along a virtual scan pattern according to a first pattern of virtual scan lines;

processing data from the virtual scan lines of the first pattern to find decodable data;

in a second frame, changing the virtual scan pattern to a second pattern of virtual scan lines, such as based on location and orientation of decodable data in the first frame;

storing (or selecting) portions of the two-dimensional scan region along a virtual scan pattern according to a second pattern of virtual scan lines;

processing data from the virtual scan lines of the second pattern to find decodable data.

Additional, the method may include further steps of (1) changing the virtual scan pattern from frame to frame from a predefined sequence of virtual scan patterns or (2) changing the virtual scan pattern on a subsequent frame based on content of the decodable data of the virtual scan lines of the previous frame.

Figure 12:
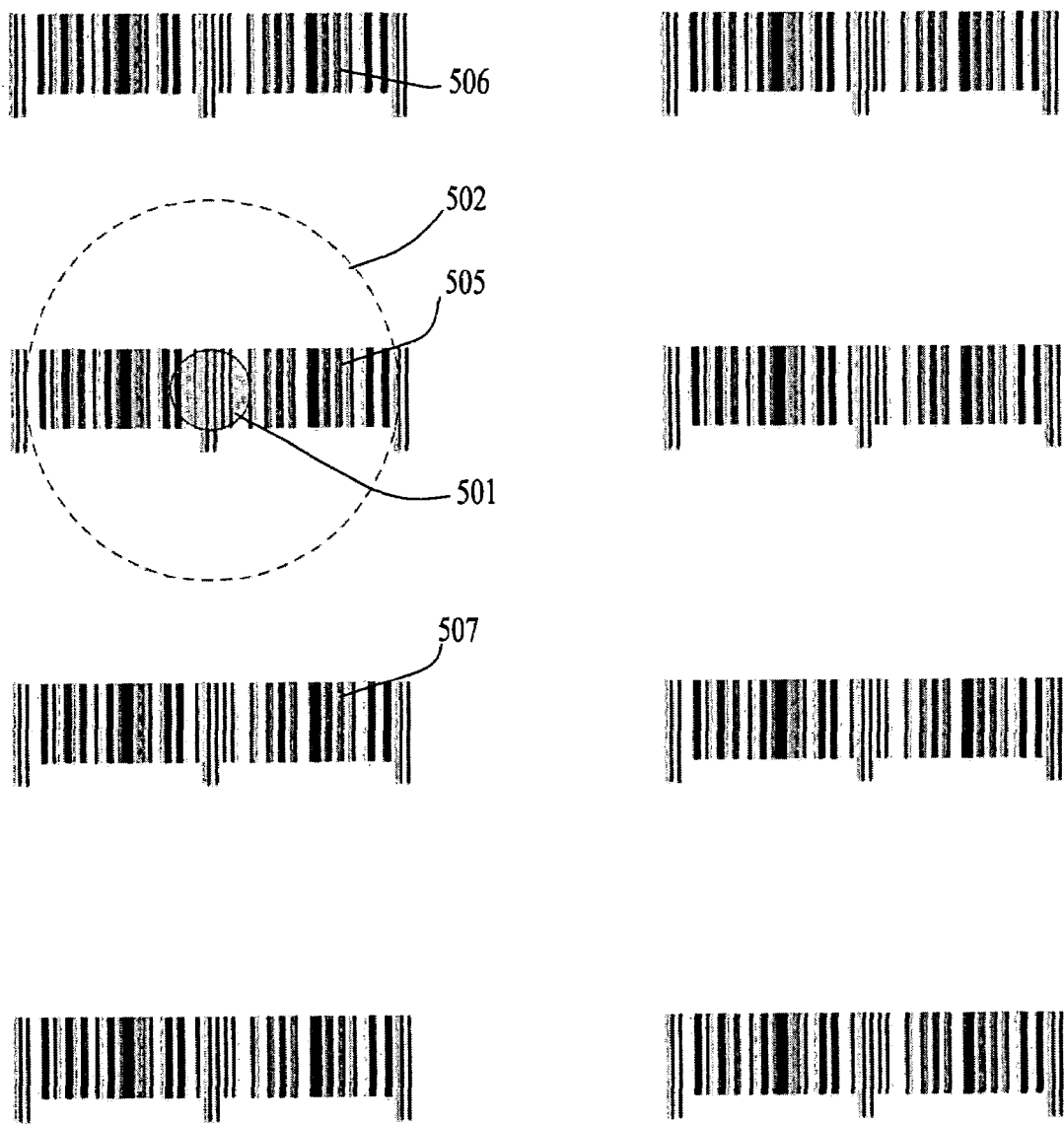
FIG. 12 is a diagram representing an application having a symmetric transmit region that is larger that the aiming spot.

FIG. 12 represents a common application where many barcodes are printed on a single sheet but only bar code 505 is to be transmitted to the host. Although aiming pattern 501 is very small, compared with bar code 505, the transmit region 502 is a large circle with a radius sufficient to allow ease of aiming. Any bar code that intersects transmit region 502 will be acknowledged and transmitted to the host. Region 502 is limited in size to insure that it does not intersect adjacent barcodes 506 and 507.

Figure 13:
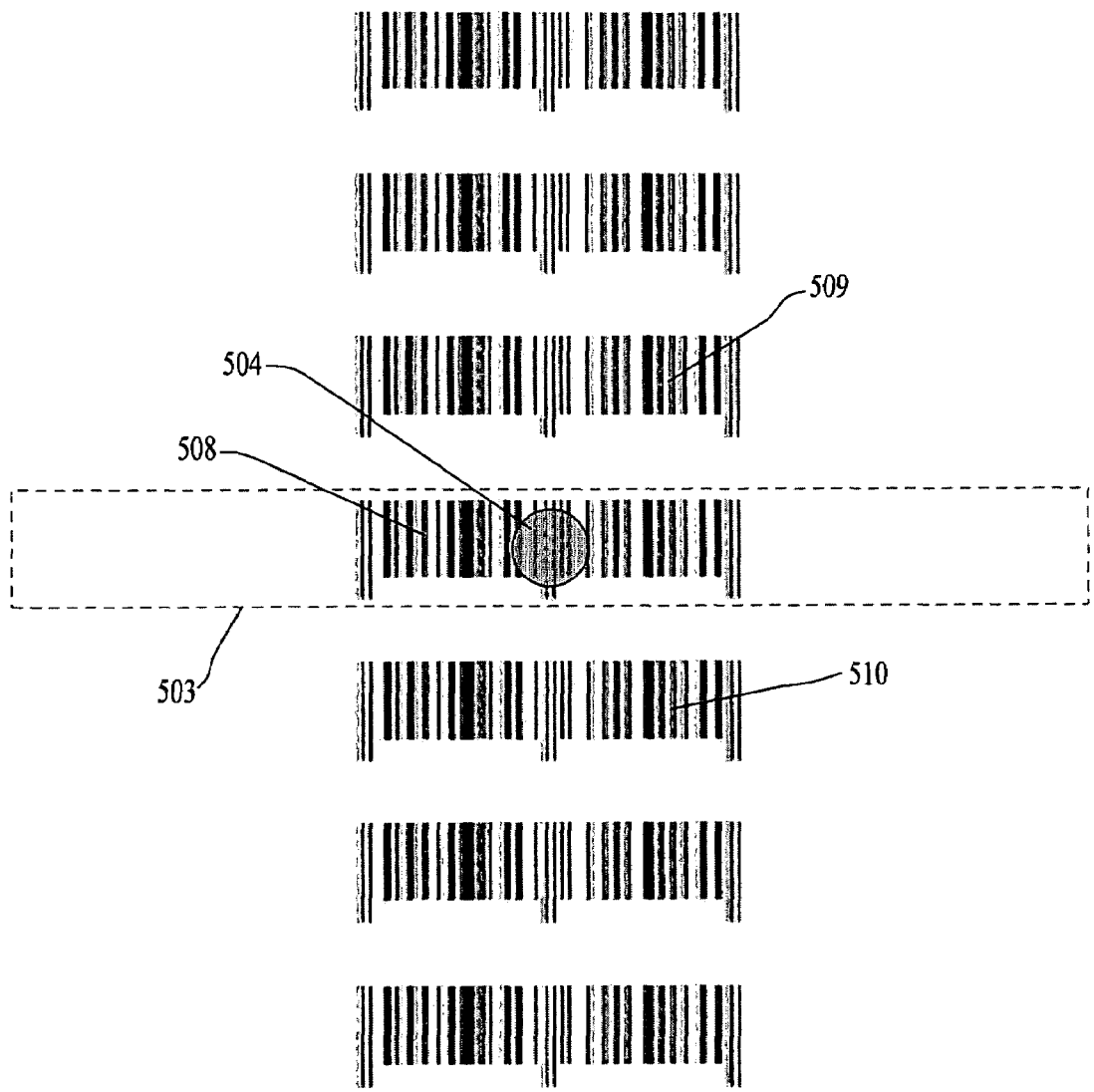
FIG. 13 is a diagram representing another application having a non-symmetric transmit region that is larger than the aiming spot.

FIG. 13 represents a different application where the barcodes are closer together and in a single column. Only bar code 508 is to be transmitted to the host. In this case, transmit region 504 is configured to be a narrow rectangle to optimize ease of aiming without allowing barcodes 509 or 510 to be transmitted accidentally.

Figure 9:
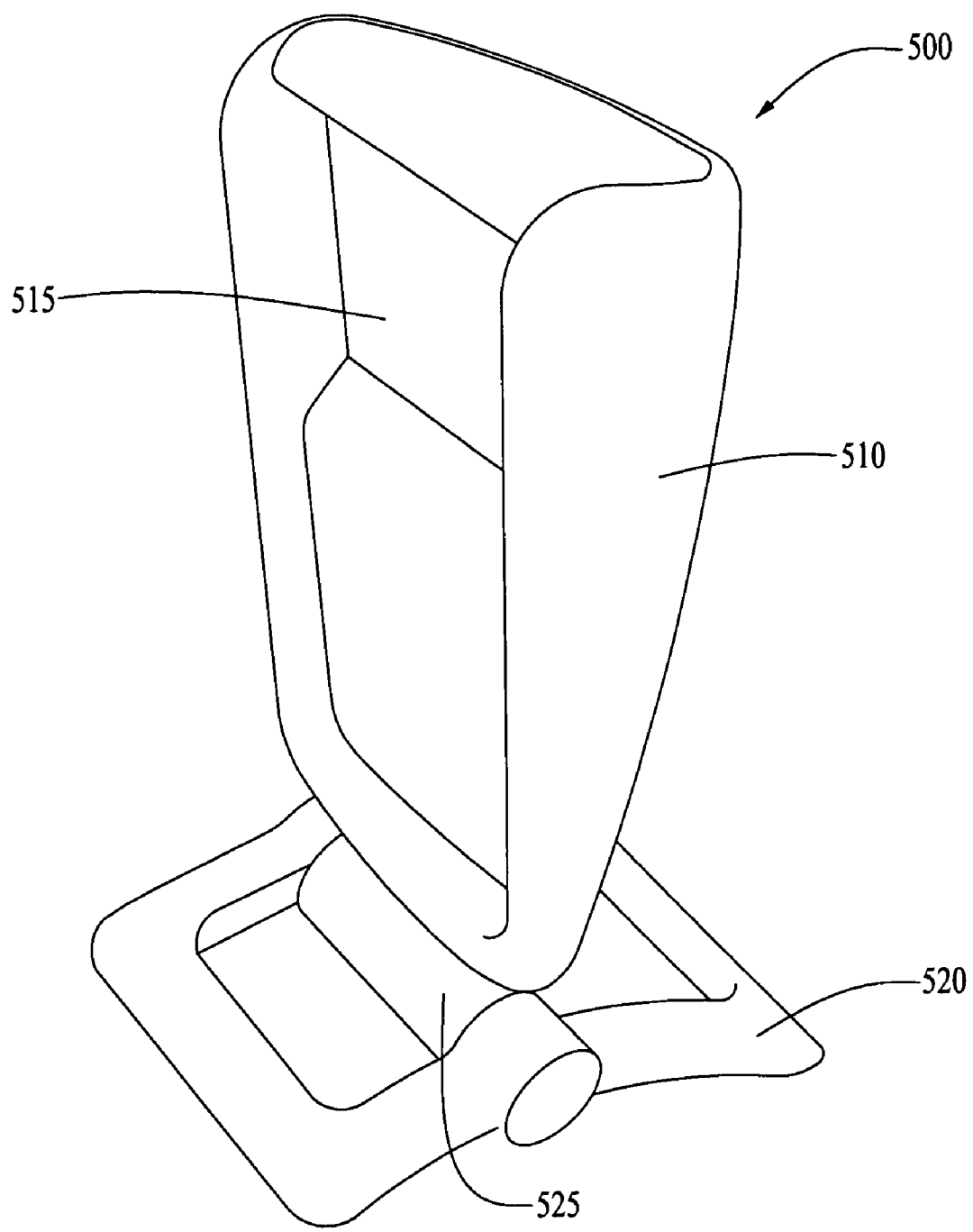
FIG. 9 is a perspective view of a data reader and housing according to a preferred embodiment.

FIG. 9 illustrates an industrial design according to one preferred embodiment for use with the reading systems and methods described herein. The reader 500 includes a reader section 510 extending vertically from base section 520. The base section 520 includes a pivoting mechanism 525 to allow the reader section 510 to pivot relative to the base section so as adjust the field of view on front of the read window 515. The reader section 510 may be grasped by the user and manipulated as a palm-style, portable scanner and aimed at the target in a handheld operating mode. The unit 500 may be movable for handheld operation with the base section 520 remaining attached to the reader section 510 or the reader section may be disconnected from the base section 520.

While various aspects of invention have been particularly shown and described with reference to certain embodiments, it will be understood by those skilled in the art that various changes in form and detail may be made without departing from the spirit and scope of the invention.

What is claimed is:

1. A method for reading one out of a plurality of optical codes present in a scan region, using a data reader, comprising the steps of:

the data reader projecting a visible aiming pattern into the scan region;

acquiring an image of the entire scan region into a sensor array including at least a first optical code and a second optical code;

by operation of a user, aligning the aiming pattern onto the first optical code;

processing a portion of the image of the scan region along a pattern of virtual scan lines to locate both the first and second optical codes at any position(s) within the scan region;

the data reader determining if the aiming pattern intersects either one of the optical codes;

if the aiming pattern is determined by the data reader to intersect the first optical code and to not intersect the second optical code, acknowledging and transmitting data acquired from the first optical code and not acknowledging and not transmitting data acquired from the second optical code.

2. A method according to claim 1 wherein the step of processing a portion of the image comprises storing only a selected portion of data comprised of only selected points of the image corresponding to the pattern of virtual scan lines.

3. A method according to claim 1 further comprising an operator positioning the aiming pattern onto the optical code.

4. A method according to claim 1 wherein the step of processing a portion of the image comprises picking off only a selected portion of data comprised of only selected points of the image corresponding to a pattern of virtual scan lines without storing all of the points of the image.

5. A method according to claim 4 further comprising decoding the selected portion of data after determining if the aiming pattern intersects the first optical code and prior to transmitting.

6. A method according to claim 4 further comprising decoding the selected portion of data after transmitting.

7. A method according to claim 4 further comprising decoding the selected portion of data prior to determining if the aiming pattern intersects the first optical code.

8. A method according to claim 1 further comprising illuminating the optical code with an illumination source, wherein the aiming pattern is generated by a light source separate from the illumination source.

9. A method according to claim 1 wherein the aiming pattern is selected from the group consisting of: an aiming spot, a two-dimensional image, an aiming line segment, a geometric pattern, a logo image.

10. A method according to claim 1 wherein the virtual scan lines forms a pattern selected from the group consisting of: a raster pattern, an asterisk pattern, a multiple raster with lines at varying angles, an omnidirectional pattern, a single line pattern, a band of a plurality of generally parallel lines.

11. A method according to claim 1 wherein the method for optical reading comprises a handheld mode of operation, wherein the operator aims a handheld data reader at the optical code for positioning the aiming pattern onto the optical code.

12. A method according to claim 1 wherein the method for optical reading comprises a fixed mode of operation, wherein the operator moves an item bearing the optical code within the scan region for positioning the aiming pattern onto the optical code.

13. A method according to claim 1 further comprising selectively switching between (a) a first mode of operation wherein an optical code is acknowledged and transmitted only if the aiming pattern is determined to intersect the optical code and (b) a second mode of operation wherein an optical code is acknowledged and transmitted regardless of whether the aiming pattern is determined to intersect the optical code.

14. A method according to claim 13 further comprising switching to the first mode of operation upon actuation of a switch by the operator.

15. A method according to claim 13 wherein the data reader comprises a portable unit selectively operable in a fixed mode and a handheld mode of operation.

16. A method according to claim 13 wherein the data reader comprises a portable unit operable in a fixed mode and a handheld mode, the method further comprising
sensing whether the data reader has been grasped by the operator;
switching to the first mode of operation upon sensing that the data reader has been grasped by the operator.

17. A method according to claim 13 further comprising projecting the aiming pattern only when operating in the first mode of operation and not the second mode of operation.

18. A method for reading optical codes with a data reader, comprising the steps of:
acquiring an image of an entire scan region into a sensor array;
reading only a selected optical code out of a plurality of optical codes present within the scan region, by the steps of
projecting a visible aiming pattern into the scan region containing at least a first optical code and a second optical code;
by action of an operator, positioning the aiming pattern onto the selected first optical code;
processing a selected portion of data at only selected points along a pattern of virtual scan lines in the scan region and thereby locating both the first and second optical codes;
by action of the data reader, determining if the aiming pattern intersects either of the first and second optical codes that have been located;
if the aiming pattern is determined by the data reader to intersect the first optical code that has been located and not intersect the second optical code, acknowledging and transmitting only the first optical code and not the second optical code, and if the aiming pattern is determined by the data reader to not intersect any optical code that has been located, then not acknowledging and not transmitting any optical code.

19. A method according to claim 18 further comprising decoding the optical code after determining if the aiming pattern intersects the optical code and prior to transmitting.

20. A method according to claim 18 further comprising decoding the optical code after transmitting.

21. A method according to claim 18 further comprising selectively switching between (a) a first mode of operation wherein an optical code is acknowledged and transmitted only if the aiming pattern is determined to intersect the optical code and (b) a second mode of operation wherein an optical code is acknowledged and transmitted regardless of whether the aiming pattern is determined to intersect the optical code.

22. A method according to claim 21 further comprising projecting the aiming pattern only when operating in the first mode of operation and not the second mode of operation.

23. A method according to claim 21 wherein the method comprises reading optical codes with a portable data reader operable in a fixed mode and a handheld mode.

24. A method according to claim 23 further comprising
while operating in the handheld mode, switching between operating in the first mode and operating in the second mode.

25. A method for reading optical codes, comprising the steps of:
acquiring with a data reader an image of a two-dimensional imaging region into a sensor array, wherein the two-dimensional imaging region contains at least a first optical code and a second optical code;
operating in a handheld mode by processing only a selected portion of data at only selected points along a pattern of virtual scan lines consisting of (a) a single virtual scan line or (b) a band of a plurality of generally parallel virtual scan lines;
operating in a fixed mode by processing only a selected portion of data at selected points along a pattern of virtual scan lines arranged in multiple directions about the two dimensional imaging region;
decoding the selected portion of data according to the pattern of virtual scan lines,
wherein the step of operating in a handheld mode further comprises
projecting a visible aiming pattern into the two dimensional imaging region;
by operation of a user, aligning the aiming pattern onto the first optical code;
by action of the data reader, determining if the aiming pattern intersects either of the first and second optical codes;
if the aiming pattern is determined by the data reader to intersect the first optical code and not the second optical code, acknowledging and transmitting data acquired from the first optical code and not from the second optical code, and if the aiming pattern is determined by the data reader to not intersect either the first or second optical codes, then not acknowledging and not transmitting data acquired from the optical codes.

26. A method according to claim 25 further comprising selectively switching between operating in the handheld mode of operation and the fixed mode of operation.

27. A method according to claim 25 further comprising
sensing whether the data reader has been grasped by a user;
switching from the fixed mode to the handheld mode upon sensing that the data reader has been grasped by the user.

28. A method according to claim 25 further comprising
providing the data reader with a switch;
switching from the fixed mode to the handheld mode upon actuation of the switch by a user.

29. A method for reading optical codes with a data reader, comprising the steps of:
acquiring an image of a two-dimensional imaging region into a sensor array;
operating in a handheld mode by generating a visible aiming pattern whereby a user positions the aiming pattern onto an optical code within the imaging region, and storing data at only selected points along a pattern of virtual scan lines determined by the data reader to intersect the aiming pattern and not storing data from virtual scan lines determined by the data reader to not intersect the aiming pattern;
decoding data that has been stored.

30. A method of data reading according to claim 29 further comprising
operating in a fixed mode by storing only a selected portion of data at selected points along a pattern of a plurality of virtual scan lines spanning the two-dimensional imaging region in multiple directions;
selectively switching operation as between the handheld mode and the fixed mode.

31. A method for reading optical symbols with a data reader, comprising the steps of:
acquiring an image of a two-dimensional imaging region into a sensor array;

projecting a visible aiming pattern into the two dimensional imaging region;

operating in a first mode by processing only a selected portion of data at only selected points along a pattern of virtual scan lines arranged in multiple directions about the two-dimensional imaging region;

operating in a second mode by processing only a selected portion of data at only selected points along a pattern of virtual scan lines determined by the data reader to intersect the aiming pattern and not processing along virtual scan lines determined by the data not to intersect the aiming pattern;

decoding the selected portion of data according to the pattern of virtual scan lines.

32. A method for reading optical symbols with a data reader, comprising the steps of:

acquiring, with the date reader, data from a two-dimensional scan region, the two-dimensional scan region containing at least a first optical code and a second optical code;

processing the data to detect the first optical code and the second optical code;

operating in a first mode by transmitting optical codes detected anywhere within the scan region;

operating in a second mode by projecting a visible aiming pattern into the two-dimensional scan region and (a) transmitting the first optical code and not the second optical code if the first optical code is determined by the data reader to intersect the aiming pattern and the second optical code is determined not to intersect, (b) transmitting neither of the optical codes if both the first and second optical codes are determined by the data reader to not intersect the aiming pattern.

33. A method according to claim 32 wherein the step of acquiring comprises acquiring data along a pattern of virtual scan lines within the two-dimensional scan region.

34. A method according to claim 32 wherein the step of acquiring comprises storing only a selected portion of the data comprised of selected points of the data corresponding to a pattern of virtual scan lines.

* * * * *

UNITED STATES PATENT AND TRADEMARK OFFICE
CERTIFICATE OF CORRECTION

| | |
|---|---|
| PATENT NO. | : 7,721,966 B2 |
| APPLICATION NO. | : 11/252997 |
| DATED | : May 25, 2010 |
| INVENTOR(S) | : Robert W. Rudeen and Bryan L. Olmstead |

It is certified that error appears in the above-identified patent and that said Letters Patent is hereby corrected as shown below:

Abstract
Line 5, change "COD" to --CCD--.

Column 1
Line 41, change "a typically" to --typically--.

Column 4
Line 46, after "larger", change "that" to --than--.
Line 66, before "optical" change "a" to --an--. (second occurrence)

Column 9
Line 26, after "optical" insert --code--.
Line 59, change "comprises" to --comprise--.

Column 10
Line 66, change "a only" to --only a--.

Column 11
Line 58, change "or" to --of--.

Column 13
Line 43, before "adjust" insert --to--.

Column 14
Line 43, change "forms" to --form--.

Column 17
Line 18, change "date" to --data--.

Signed and Sealed this
Fourth Day of October, 2011

David J. Kappos
*Director of the United States Patent and Trademark Office*